July 23, 1957 A. ZITTRELL 2,800,033
SWITCHING ARRANGEMENT FOR MOTOR VEHICLE CHANGE SPEED GEARS
Filed May 27, 1954 2 Sheets-Sheet 1
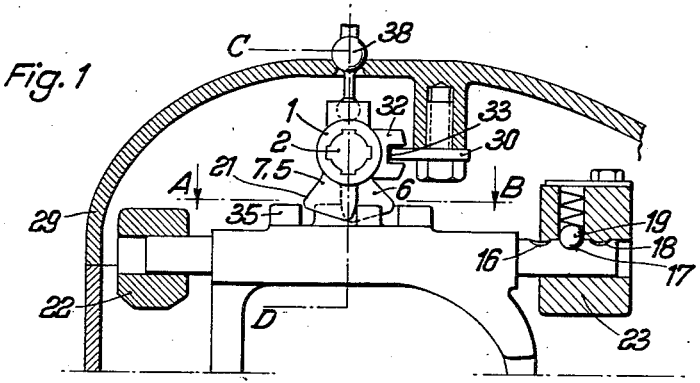
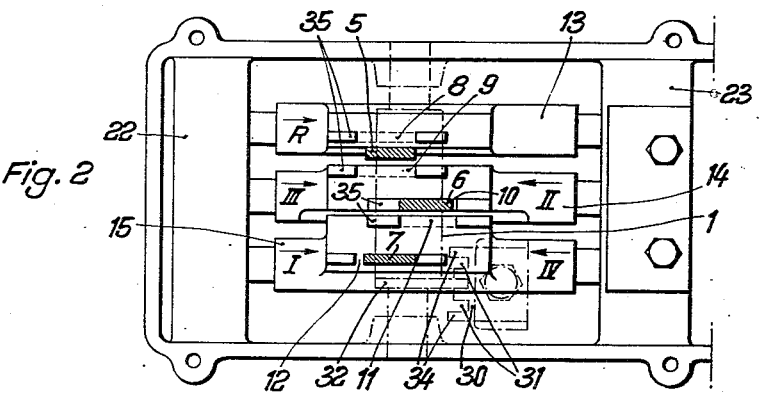
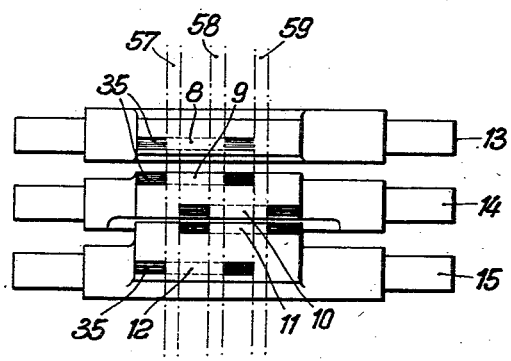
Inventor:
ANTON ZITTRELL,
BY Pat... & ...
ATTORNEYS July 23, 1957 A. ZITTRELL 2,800,033
SWITCHING ARRANGEMENT FOR MOTOR VEHICLE CHANGE SPEED GEARS
Filed May 27, 1954 2 Sheets-Sheet 2
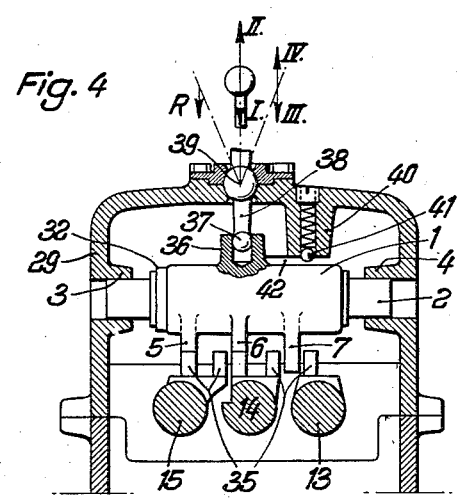
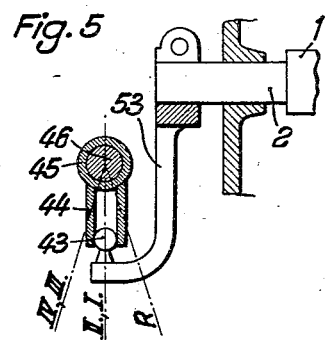
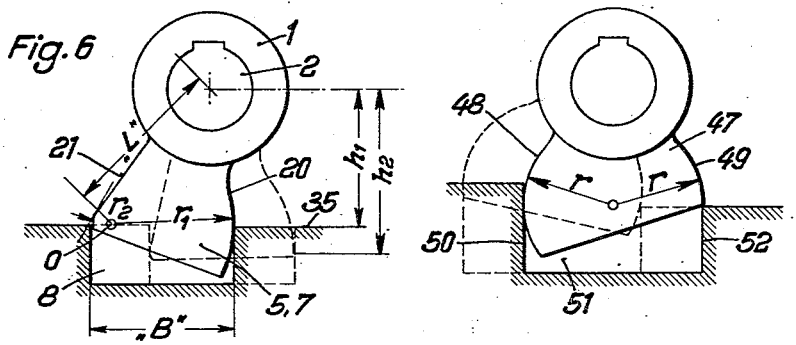
Inventor:
ANTON ZITTRELL,
BY Parky and Gross
ATTORNEYS United States Patent Office 2,800,033
Patented July 23, 1957

2,800,033

SWITCHING ARRANGEMENT FOR MOTOR VEHICLE CHANGE SPEED GEARS

Anton Zittrell, Friedrichshafen am Bodensee, Germany, assignor to Zahnradfabrik Friedrichshafen, Friedrichshafen am Bodensee, Germany Application May 27, 1954, Serial No. 432,853

Claims priority, application Germany June 12, 1953

2 Claims. (Cl. 74—473)

The present invention relates to a switching arrangement for motor vehicle change speed gears with several switching rods which are arranged adjacently and are slidable longitudinally and provided with cut-out portions and a switching member which engages into the cut-out portions in order to allow the displacement of one of the switching rods.

There are known already switching arrangements which have several parallel switching rods which can be actuated by means of a drive switch lever provided with a finger and with the cooperation of locking bodies and locking plates. This known type of switching arrangements consists of many single parts which move in their bearings with a play and cause a large total play of the switching arrangement.

The switching arrangement of the present invention does not have any special locking bodies and avoids therefore the above mentioned disadvantage. The switching rods are displaced in the present invention by means of a switching member which is mounted rotatably and displaceably transversely to the switching rod shaft which switching member has several switching cams which reach into cut-out portions of the switching rods, the cams lying in several planes which are perpendicular to the switch sleeve axis switching cams and/or the cut-out portions in the switching rods are arranged in respect to the axis characterizing the neutral position of the switching cam unsymmetrically in such a way that each switching cam begins its action from its neutral position only in one rotational direction of the switching member.

A preferred embodiment of the invention provides a switching cam which is executed as an unsymmetrical member of uniform thickness, that is, a switching cam the front and back edges of which have a circular form and have the same center of curvature, the front edge having a larger radius of curvature than the back edge. The cut-out portions in the switching rods are rectangular. With such a form of cam and of the cut-out portion it is achieved that at the beginning of the switching movement from the neutral position of the cam the greatest effective switching force can be exerted.

In the known switching levers the effective lever arm length is a multiple of the width of the switching finger. This type of construction makes necessary a high drive housing. Furthermore the effective lever arm length along the switching lever movement is approximately constant.

A characteristic sign of a switching arrangement of the present invention is the short compact form of the switching cam. The effective switching force at the beginning of the stroke of an unsymmetrical switching cam can be approximately twice as large as the effective switching force at the end of the stroke.

A preferred form of a switching arrangement according to the present invention consists of a switching member in the form of a spline shaft with several switching cams which are made uniform throughout and in the shape of a disc, and with a bore which is appropriately grooved with respect to the spline shaft. The cam discs are usually attached on the spline shaft by placing separating rings intermediate thereto and arranged in rows on the spline shaft like a mirror image.

The front edge of the switching cams and thus the cut-out portions of the switching rods are displaced in such a way with respect to an axis which is perpendicular to the switching rods that the working edges of the cut-out portions can be worked on with a gang cutter in the same clamping operation.

The switching sleeve can be displaced by a known lever which is ball mounted. There can be provided, however, especially in connection with a switching rod arrangement which is fastened to a steering wheel also a switching lever which is displaceable longitudinally in a known manner and which is rotatable, which switching lever actuates an angle arm fastened to the switching sleeve shaft.

The switching cam can also be provided with a front and back edge which is bent in an involute manner and the switching rod be made with a cut-out portion in the shape of a trapezoid.

Furthermore one can use a cam provided with a front and back edge of the same curvature in connection with a cut-out portion the front and back edges of which lie at a right angle to the switching rod shaft and are of unequal lengths.

In the attached drawing several embodiments of the invention are shown and they indicate:

Figure 1 a front view of the switching lever and of a switching rod with a drive housing in section.

Figure 2 a plan view of the three switching rods with the switching cams, the latter in a section along line A—B (Fig. 1).

Figure 3 shows a plan view of the three switching rods with the cut-out portions and their treatment by means of gang cutters.

Figure 4 a side view of the switching sleeve with the three switching rods, an actuating lever and drive housing in cross section.

Figure 5 shows a further embodiment of a switching lever.

Figure 6 shows a switching cam according to Figure 1 in an enlarged scale.

Figure 7 shows a further embodiment of a switching cam with an unsymmetrical form of the cut-out portion.

In Figure 1 is indicated by 1 a switching sleeve, which is rotatable on a shaft 2 in the mounting eyes 3 and 4 (see Figure 4) and mounted displaceably in the direction of the shaft. The switching sleeve 1 is provided with switching cams 5, 6, 7 which are distributed at certain intervals along the switching lever axis and displaced radially with respect to each other. The switching cams 5, 6, 7 can be brought into engagement with cut-out portions 8, 9, 10, 11, 12 by rotation and displacement of switching sleeve 1, which cut-out portions are provided on the three switching rods 13, 14, 15 which are arranged parallel next to each other and displaceable along their axis (see Fig. 2).

The switching rod 13 has two, the switching rods 14 and 15 each three notches, 16, 17, 18, which lie adjacently into which a spring biased ball 19 sets (Fig. 1). The switching cams 5, 6, 7 have a front edge 20 which is preferably rounded off in a circular shape and a similarly rounded off back edge 21 with substantially smaller rounding off radius and the central switching cam 6 lies like a mirror image with respect to the switching cams 5 and 7. The switching movement of the switching rods 13, 14, 15 from the neutral position shown into the intended gear position is started each time through front edge 20 of one of the switching cams 13, 14, 15. The returning of the switching rods into their neutral position is obtained by the back edge 21 of the switching cams. The larger rounding off radius of the front edge 20 of the switching cams acts in such a way that at the beginning of the switching movement from the neutral position of the switching rods there is, with the switching moment remaining equal, exerted a larger force on the switching members than there is toward the end of the switching movement. The property of the switching cam of the present invention works out favorably with switching devices having locking synchronization which require at the beginning of the coupling movement a larger switching force.

In Figure 2 the switching rods 13, 14, 15 and the drive housing 29 are shown in plan view. The switching sleeve 1 with a plate 32 is shown in phantom lines. The switching rods are mounted non-rotatably and longitudinally slidable in the bearing ledges 22 and 23. On the side directed toward the switching sleeve 1 (Fig. 1) the switching rods are provided with ledges 35, which have cut-out portions 8, 9, 10, 11 and 12, into which reach the switching cams 5, 6, 7 of switching sleeve 1. Switching rod 13 for the reverse gear has the cut-out portion 8. Switching rod 14 has a cut-out portion 9 for the third gear and a cut-out portion 10 for the second gear. Switching rod 15 has cut-out portions 11 for the fourth gear and 12 for the first gear. The corresponding gears and directions of engagement are indicated by arrows, the letter R and the numerals 1 to 4. The ledges 35 lie at such intervals from each other that in each case one of the switching cams 5, 6, 7 which are represented in a shaded manner can move freely between them. The switching cams are represented in the axial and radial center position of the switching sleeve 1. From this position there is engaged by means of the switching cam 6 through a rotation to the right of the switching sleeve (see Fig. 2) the second gear and by means of switching cam 7 by rotation to the left of switching sleeve 1 the first gear. Upon actuating one of the switching cams which is in engagement the other one remains without effect because of its displaced arrangement.

Upon longitudinal displacement of switching sleeve 1 upwardly the cam 5 comes into engagement with the switching rod 13 and engages by a rotation to the left of switching sleeve 1 the reverse gear. Upon a longitudinal displacement of the switching sleeve 1 downwardly cam 7 is released. Cam 6 displaces upon a rotation to the right the switching rod 15 to the left (fourth gear) and cam 5 moves, upon a rotation to the left, switching rod 14 to the right (third gear).

The arrangement of the cams and cut-out portions shown for the four forward gears and one reverse gear represents only one possible embodiment. For instance, one can provide by arranging a second cut-out section on the switching rod 13 and a fourth cam in the swing of cam 6 a switching possibility for a further gear. This further gear would be switched by rushing the switching lever into its end portion and by a rotation to the right.

Slide plate 30 is attached on drive housing 29 (see Fig. 1) and has three cut-out portions 31 (Fig. 2) which correspond to the three longitudinal positions to switching sleeve 1. Plate 32 is connected with it and has a slot 33 (see Fig. 1). Plate 32 has the effect that the longitudinal displacement of switching sleeve 1 is possible only in its neutral position, which is drawn. Similarly the rotation is possible only in the three switching positions, which are determined by the three cut-out portions 31. The two outer fingers 34 (Fig. 2) limit the longitudinal movement of the switching sleeve in the neutral position.

Figure 3 shows the three switching rods 13, 14, 15 again in plan view. The three surface strips, 57, 58, 59 indicated by phantom lines show the course of a gang cutter which works on the front and back working surfaces of ledges 35 or cut-out portions 8 to 12 during the same clamping operation.

Figure 4 represents a cross section through the switching arrangement along line C—D (Fig. 1). Numeral 1 indicates the switching sleeve with plate 32 and the switching cams 5, 6 and 7. Below the switching sleeve the three switching rods 13, 14, 15 with the individual switching ledges 35 are mounted. Switching sleeve 1 is provided with a pot 36 in which the ball-shaped end 37 of switch lever 38 reaches. Switching lever 38 is mounted movably in ball socket 39.

In eye 40 of drive housing 29 a spring biased ball 41 is mounted against which switching sleeve 1 makes contact with a stop 42 in the central position shown. Before moving from this central position to the right into the position for the reverse gear the resistance of the spring biased ball 41 has to be overcome. At the outer end of switch lever 38 the switching diagram of the individual lever positions for the first to the fourth gear and the reverse gear are indicated.

Figure 5 shows a further embodiment of an actuating lever. On shaft 2 of switching sleeve 1 angle arm 53 is attached. The latter has a ball 43 which reaches into the cylindrical sleeve 44 of switching lever 45. Switching lever 45 is rotatable about its shaft 46 and mounted so as to be displaceable longitudinally in its direction and can be actuated by a switching arrangement which is mounted on the steering wheel. The numerals 1 to 4 with the letter R indicate the switching diagram.

Figure 6 represents switching sleeve 1 of Fig. 1 in larger scale, namely in the neutral position in full lines, in the position at the end of the engaging movement in hatched lines. Numeral 8 indicated the cut-out portion in the switching rod 13. Cam 7 has a front edge 20 with the curvature radius $r1$ and a back edge 21 with the curvature radius $r2$. The front and back edges have a common center of curvature O. The force contact point at the beginning of the engaging movement between the front edge 20 and the contact making edge of cut-out portion 8 lies in the lever interval $h1$ from the point of rotation; at the end of the engaging movement however in the larger interval $h2$. Upon an opposite rotation from the neutral position towards the left the cam comes out of engagement while a further cam which is not represented, having a mirror image arrangement, is engaged upon the same direction of rotation toward the left. The ratio switch lever length: cam width is approximately 1.22.

Figure 7 shows a further possible embodiment of the switching cam with the same radius of curvature $r$ of the front and back edge. Cam 47 is represented in the neutral position in full lines and at the end of the engaging position in hatched lines.

The working edge 50 of cut-out portion 51 for the engaging movement is higher than the opposite edge 52. Furthermore the corresponding edges of cam 47 are of different length, namely the front edge 48 is longer than the back edge 49. It is thus obtained that the cam is engaged with the switching rod from the neutral position only in one direction of rotation.

I claim:

1. A gear shift mechanism comprising a plurality of reciprocal gear shifting bars having notches, and cams selectively engageable in respective notches for shifting respective bars, means for selectively actuating said cams by rotation thereof, each of said cams having a pair of cam surfaces engageable with the opposed sides of an engaged notch to move a bar in one direction or the opposite direction, said cam surfaces of each cam being circular and having a common center of arcuateness, wherein the cam surface for moving a bar in said one direction is of larger radius than the other cam surface, the center of rotation of said cam being offset from the center of arcuateness of said cam surfaces toward the cam surface of larger radius.

2. A gear shifting mechanism for motor vehicles comprising a plurality of slidable, spaced shifting rods parallel to each other and provided with recesses having longitudinally spaced walls, a rotative sleeve member longitudinally slidable in a direction normal to the parallel axes of said rods and in a plane substantially equally spaced from the plane of said axes, said sleeve having shifting cams engageable with the walls of the recesses of selected shifting rods, said cams being provided with front and back cam edges of circular contour, said back edges being of smaller radius than said front edges.

References Cited in the file of this patent

UNITED STATES PATENTS

| | | |
|---|---|---|
| 2,344,096 | Kummich | Mar. 14, 1944 |
| 2,485,034 | Bugatti | Oct. 18, 1949 |